United States Patent
Chaiken

(10) Patent No.: US 7,272,731 B2
(45) Date of Patent: Sep. 18, 2007

(54) INFORMATION HANDLING SYSTEM HAVING REDUCED POWER CONSUMPTION

(75) Inventor: Craig Chaiken, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 231 days.

(21) Appl. No.: 10/964,153

(22) Filed: Oct. 13, 2004

(65) Prior Publication Data

US 2006/0080561 A1    Apr. 13, 2006

(51) Int. Cl.
G06F 1/00 (2006.01)
G06F 1/26 (2006.01)
G06F 1/32 (2006.01)

(52) U.S. Cl. .................. 713/300; 713/310; 713/320

(58) Field of Classification Search ........... 713/300, 713/310, 320
See application file for complete search history.

(56) References Cited

U.S. PATENT DOCUMENTS

| | | | | |
|---|---|---|---|---|
| 5,530,879 A | * | 6/1996 | Crump et al. | 713/323 |
| 5,548,763 A | * | 8/1996 | Combs et al. | 713/323 |
| 5,715,465 A | * | 2/1998 | Savage et al. | 713/340 |
| 5,778,237 A | * | 7/1998 | Yamamoto et al. | 713/322 |
| 5,919,263 A | * | 7/1999 | Kikinis et al. | 713/320 |
| 6,016,548 A | * | 1/2000 | Nakamura et al. | 713/323 |
| 6,055,643 A | * | 4/2000 | Chaiken | 713/323 |
| 6,065,123 A | * | 5/2000 | Chou et al. | 713/322 |
| 7,000,133 B2 | * | 2/2006 | Dodd et al. | 713/324 |
| 7,082,542 B2 | * | 7/2006 | Cooper | 713/320 |

OTHER PUBLICATIONS

Power Management (http://website.lineone.net/pc.relief/pwrmng.htm).

* cited by examiner

Primary Examiner—Chun Cao
Assistant Examiner—Ji H Bae
(74) Attorney, Agent, or Firm—Haynes and Boone, LLP

(57) ABSTRACT

In response to an information handling system (IHS) being inactive, an instruction to place the IHS's processor in a low power state is generated. Also, in response to the instruction, a first value of an operational parameter of the processor is stored. Moreover, the operational parameter of the processor is modified to a second value so that the IHS consumes less power while the processor operates with the operational parameter that is modified to the second value. Further, in response to the IHS not placing the processor in a low power state within a predetermined time period, the operational parameter of the processor is restored to the first value.

20 Claims, 4 Drawing Sheets

100

INFORMATION HANDLING SYSTEM HAVING REDUCED POWER CONSUMPTION

BACKGROUND

The description herein relates to information handling systems (IHS) having reduced power consumption.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For a user of an IHS, reducing the amount of power consumed by the IHS is important. In one example, for a portable IHS (e.g., a "laptop" or a "notebook" computer), an amount of time that the portable IHS is operable under battery power is associated with amount of the portable IHS's power consumption. An IHS that consumes more power may cause various problems such as a shorter battery life.

Accordingly, what is needed is an IHS without the disadvantages discussed above.

SUMMARY

In response to an information handling system (IHS) being inactive, an instruction to place the IHS's processor in a low power state is generated. Also, in response to the instruction, a first value of an operational parameter of the processor is stored. Moreover, the operational parameter of the processor is modified to a second value so that the IHS consumes less power while the processor operates with the operational parameter that is modified to the second value. Further, in response to the IHS not placing the processor in a low power state within a predetermined time period, the operational parameter of the processor is restored to the first value.

DETAILED DESCRIPTION

For purposes of this disclosure, an IHS includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
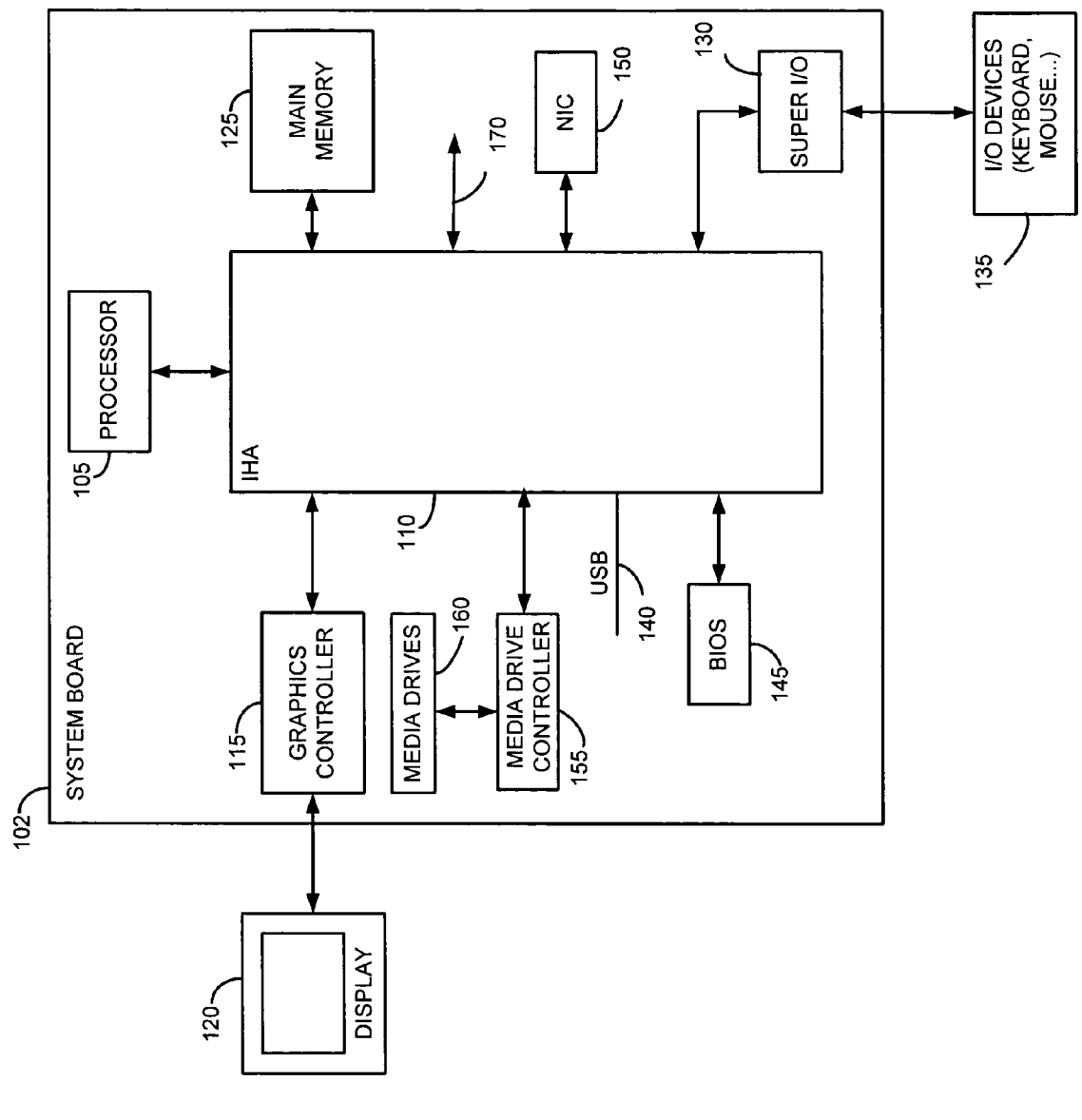
FIG. 1 is a block diagram of an information handling system, according to the illustrative embodiment.

FIG. 1 is a block diagram of an IHS, according to the illustrative embodiment. The IHS 100 includes a system board 102. The system board 102 includes a processor 105 such as an INTEL Pentium series processor or one of many other processors currently available. An INTEL Hub Architecture (IHA) chipset 110 provides the IHS system 100 with graphics/memory controller hub functions and I/O functions. More specifically, the IHA chipset 110 acts as a host controller which communicates with a graphics controller 115 coupled thereto. A display 120 is coupled to the graphics controller 115. The chipset 110 further acts as a controller for main memory 125 which is coupled thereto. The chipset 110 also acts as an I/O controller hub (ICH) which performs I/O functions. A super input/output (I/O) controller 130 is coupled to the chipset 110 to provide communications between the chipset 110 and input devices 135 such as a mouse, keyboard, and tablet, for example. A universal serial bus (USB) 140 is coupled to the chipset 110 to facilitate the connection of peripheral devices to system 100. System basic input-output system (BIOS) 145 is coupled to the chipset 110 as shown. The BIOS 145 is stored in CMOS or FLASH memory so that it is nonvolatile.

A local area network (LAN) controller 150, alternatively called a network interface controller (NIC), is coupled to the chipset 110 to facilitate connection of the system 100 to other IHSs. Media drive controller 155 is coupled to the chipset 110 so that devices such as media drives 160 can be connected to the chipset 110 and the processor 105. Devices that can be coupled to the media drive controller 155 include CD-ROM drives, DVD drives, hard disk drives and other fixed or removable media drives. An expansion bus 170, such as a peripheral component interconnect (PCI) bus, PCI express bus, serial advanced technology attachment (SATA) bus or other bus is coupled to the chipset 110 as shown. The expansion bus 170 includes one or more expansion slots (not shown) for receiving expansion cards which provide the IHS 100 with additional functionality.

As discussed above, for users of an IHS (e.g., the IHS 100), reducing the IHS's power consumption is important.

Example techniques of reducing power consumption of the IHS 100 include throttling (e.g., varying a duty cycle of) the processor 105, temporarily reducing the processor 105's clock speed (e.g., for one of INTEL series of processors, by reducing the Geyserville value of the processor), and/or placing the processor 105 in a reduced power state (e.g., one of INTEL processor's "C-states").

Although throttling the processor 105 and temporarily reducing the processor 105's clock speed reduce the IHS 100's power consumption, such techniques also potentially adversely affect the IHS 100's performance. For example, such techniques potentially reduce the IHS 100's responsiveness to a user's command because the IHS executes its various processes (e.g., processes associated with an application such as a word processing application) more slowly.

Accordingly, the IHS 100 executes processes discussed below in connection with FIGS. 2, 3, and 4. The IHS 100 executes such processes so that the IHS 100's power consumption is reduced while also reducing adverse effects on the IHS 100's performance.

Figure 2:
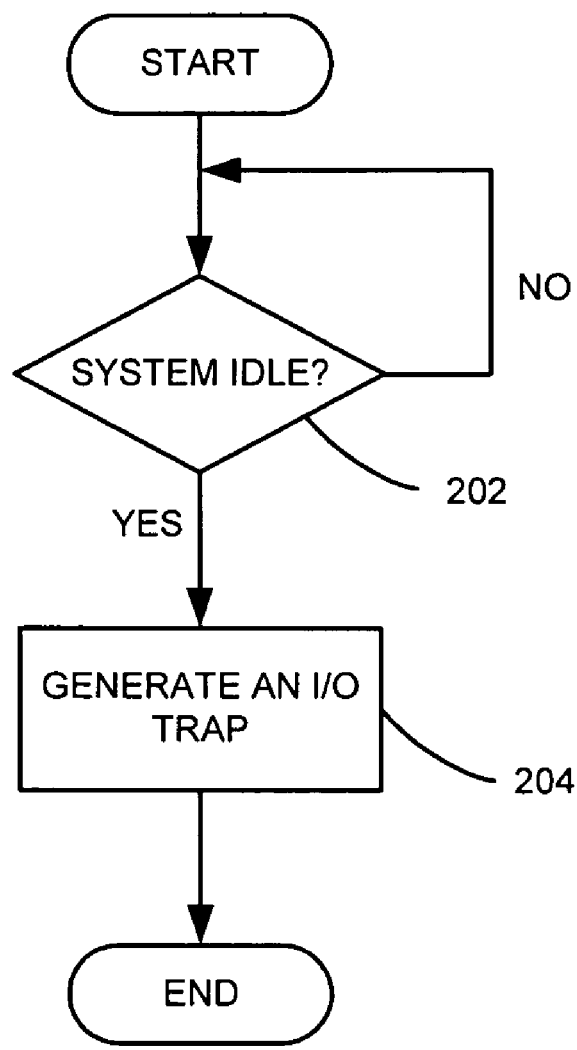
FIG. 2 is a flow chart illustrating the operations of a process executed by the IHS of FIG. 1

FIG. 2 is a flow chart illustrating the operations of a process executed by the IHS 100 of FIG. 1. In the illustrative embodiment, the process illustrated in FIG. 2 is executed as a portion of the IHS 100's operating system ("OS").

The operation begins at a step 202, where the IHS 100 self loops until the IHS 100 determines that it is inactive (e.g., "idle"). In one example, the IHS 100 determines that it is idle if it determines that it has not received a user command (e.g., a user input via a mouse or a keyboard) within a previously determined period of time. After the step 202, the operation continues to a step 204.

At the step 204, the IHS 100 generates an input/output ("I/O") instruction or an I/O message. One example of such instruction or message is an I/O "trap. In the illustrative embodiment, such I/O trap is generated as a system management interrupt ("SMI"). Another process executed by the IHS 100 (discussed below in more detail in connection with FIGS. 3 and 4) responds to the I/O trap generated at the step 204 so that the IHS 100 the IHS 100's power consumption is reduced. After the step 204, the operation ends.

Figure 3:
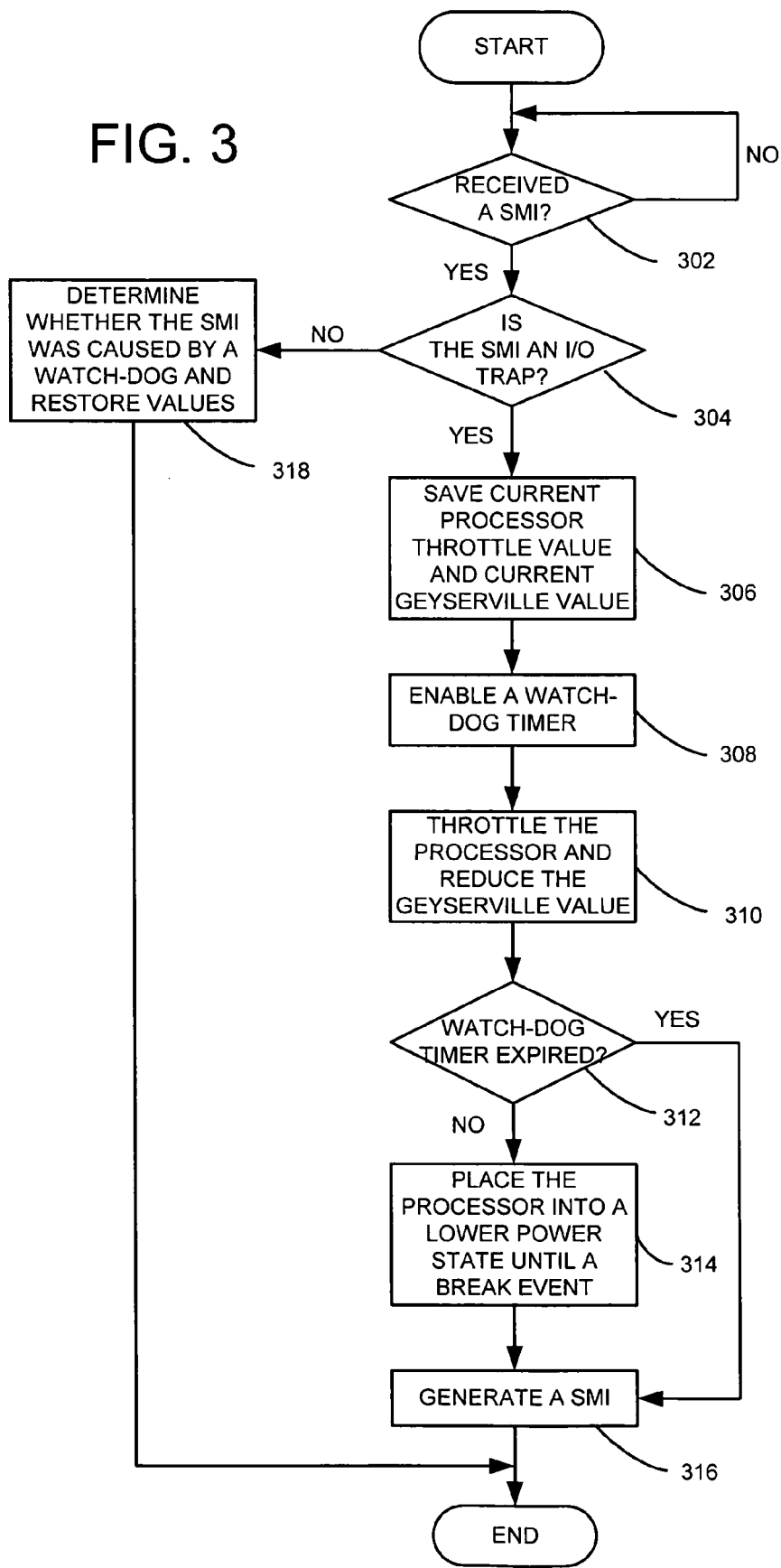
FIG. 3 is a flow chart illustrating the operations of another process executed by the IHS of FIG. 1.

FIG. 3 is a flow chart illustrating the operations of another process executed by the IHS 100 of FIG. 1. In the illustrative embodiment, the process illustrated in FIG. 3 is executed by the IHS 100 as a part of the IHS 100's SMI handler.

The operation begins at a step 302, where the IHS 100 self loops until it has determined that it has received a SMI. After the step 302, the operation continues to a step 304.

At the step 304, the IHS 100 determines whether the SMI received at the step 302 is an I/O trap (e.g., the I/O trap generated at the step 204 of FIG. 2) that is generated by an OS. If the IHS 100 determines that the SMI is an I/O trap, the operation continues to a step 306. Otherwise, the operation continues to a step 318, where the IHS 100 determines whether the SMI was generated in response to a timer (e.g., a watch-dog timer discussed in more detail below in connection with a step 308) and if so, performs one or more operations (discussed in more detail below in connection with FIG. 4). After the step 318, the operation ends.

At the step 306, the IHS 100 stores (e.g., "saves") its processor's operational parameter such as the processor's throttle value and/or current Geyserville value. After the step 306, the operation continues to a step 308.

At the step 308, the IHS 100 enables (e.g., "sets") a watch-dog timer. In the illustrative embodiment, the IHS 100 sets the timer for a period that is approximately equal to the IHS 100's OS's two time slices (e.g., 20 milliseconds). In other embodiments, the IHS 100 sets the timer for a period that is approximately equal to another suitable amount of time (e.g., three OS time slices). After the step 308, the operation continues to a step 310.

At the step 310, the IHS 100 modifies the processor's operational parameter (e.g., reduces the processor's throttle value and/or reduces the Geyserville value) so that the IHS 100 consumes less power in its operation. After the step 310, the operation continues to a step 312.

At the step 312, the IHS determines whether the watch-dog timer that was set at the step 308 has expired. The watch-dog timer that was set at the step 308 expires if the IHS 100 does not detect an I/O trap (e.g., an I/O trap generated in response to the IHS 100 being idle) during the time period for which the watch-dog timer is set. If the IHS 100 determines that the watch-dog timer has not expired, the IHS also determines that it was specified to place the processor into a lower power state. Accordingly, in such situation, the operation continues to a step 314, where the IHS 100 places the processor into a lower power state until it detects a break event (e.g., the IHS 100 detects a user input).

If at the step 312, the IHS determines that the watch-dog timer has expired without the IHS 100 being specified (e.g., via an I/O trap) to place the processor into a lower power state, the operation continues to a step 316. At the step 316, the IHS 100 generates a SMI in response to the watch-dog timer expiring.

Referring again to the step 304 discussed above, if the IHS 100 determines that the SMI received at the step 302 is not an I/O trap, the IHS determines whether the SMI was generated in response to the watch-dog timer expiring, and if so, performs operations to restore the processor's previous configuration or operational state (as discussed below in connection with FIG. 4).

Figure 4:
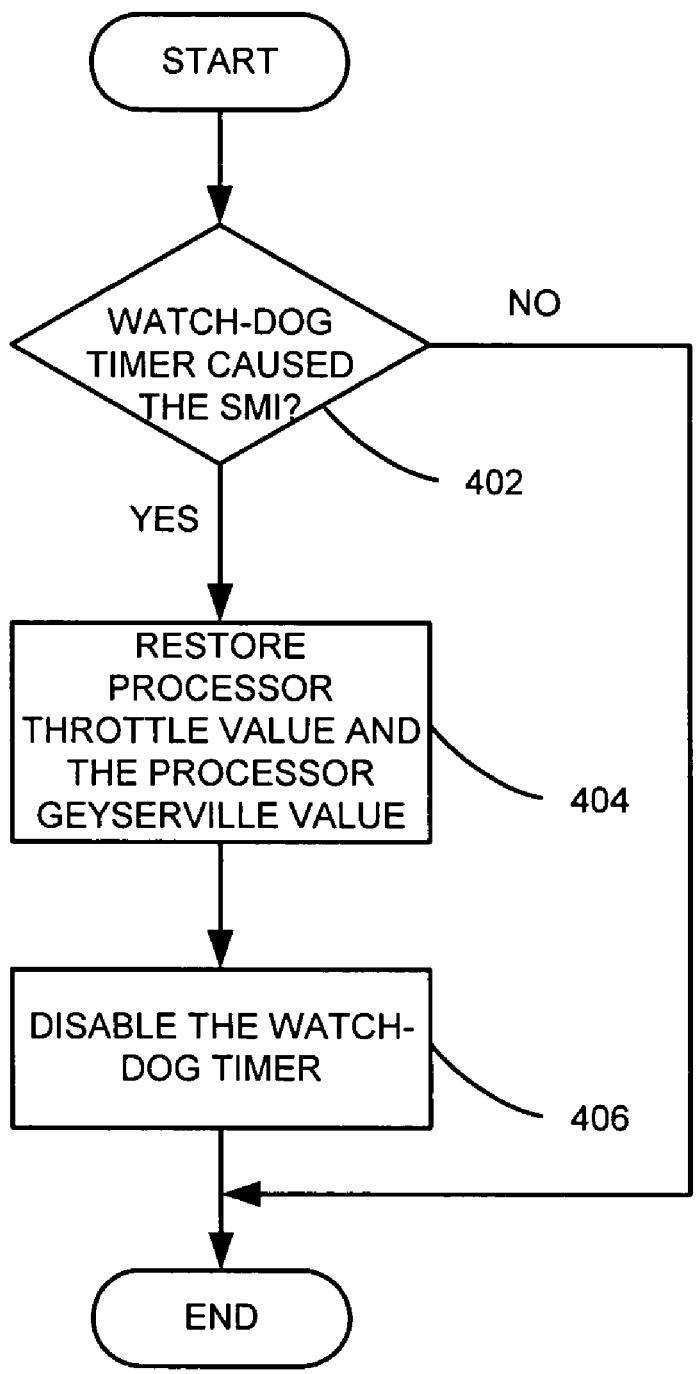
FIG. 4 is a flow chart illustrating the operations executed by the IHS to restore its processor's operational parameters after performing operations to reduce the IHS's power consumption.

Accordingly, FIG. 4 is a flow chart illustrating the operations executed by the IHS 100 to restore its processor's operational parameters after performing operations (discussed above in connection with FIG. 3) to reduce the IHS 100's power consumption. The operation begins at a step 402, where the IHS 100 determines whether the SMI received at the step 302 of FIG. 3 was generated in response to the watch-dog timer expiring. If the IHS 100 makes such determination, the operation continues to a step 404. Otherwise, the operation ends as shown.

At the step 404, the IHS 100 restores the processor's throttle value and/or the Geyserville value that were stored in the step 306. After the step 404, the operation continues to a step 406.

At the step 406, the IHS 100 disables the watch-dog timer. After the step 406, the operation ends as shown.

As discussed above, in response to the IHS 100 being idle, the IHS 100 is capable of throttling (e.g., aggressively throttling) the processor and reducing (e.g., aggressively reducing) the processor's clock speed so that the IHS consumes less power. Also, in response to the IHS 100 becoming busy (e.g., because of a user input), the IHS 100 is capable of resuming its operation at full performance level within the time period for which the watch-dog timer is set at the step 308 of FIG. 3.

Although illustrative embodiments have been shown and described, a wide range of modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A method comprising:
   in response to an information handling system (IHS) being inactive, generating an instruction to place a processor of the IHS in a low power state;
   in response to the instruction, storing a first value of an operational parameter of the processor;
   modifying the operational parameter of the processor to a second value so that the IHS consumes less power while the processor operates with the operational parameter that is modified to the second value; and
   in response to the IHS not detecting an input/output (I/O) trap within a predetermined time period, restoring the operational parameter of the processor to the first value.

2. The method of claim 1, wherein the predetermined time period is approximately equal to two time slices of an operating system (OS) of the IHS.

3. The method of claim 1, wherein the predetermined time period is measured by a watch-dog timer.

4. The method of claim 3, and comprising:
   in response to the IHS not detecting an I/O trap within the predetermined time period, disabling the watch-dog timer.

5. The method of claim 1, wherein the operational parameter includes a throttle value of the processor.

6. The method of claim 1, wherein the operational parameter includes a Geyserville value of the processor.

7. The method of claim 1, wherein the instruction is an I/O trap.

8. The method of claim 7, wherein the I/O trap is generated as a system management interrupt (SMI).

9. The method of claim 1, wherein the storing, the modifying, and the restoring are performed by a SMI handler.

10. The method of claim 1, wherein the instruction is generated by an operating system ("OS") of the IHS.

11. An information handling system (IHS) comprising:
    a processor; and
    a memory coupled to the processor, which stores code executable by the IHS to cause the IHS to:
       in response to the IHS being inactive, generate an instruction to place the processor in a low power state;
       in response to the instruction, store a first value of an operational parameter of the processor;
       modify the operational parameter of the processor to a second value so that the IHS consumes less power while the processor operates with the operational parameter that is modified to the second value; and
       in response to the IHS not detecting an input/output (I/O) trap within a predetermined time period, restore the operational parameter of the processor to the first value.

12. The IHS of claim 11, wherein the predetermined time period is approximately equal to two time slices of an operating system (OS) of the IHS.

13. The IHS of claim 11, wherein the predetermined time period is measured by a watch-dog timer.

14. The IHS of claim 13, wherein the code is executable by the IHS to further cause the IHS to: in response to the IHS not detecting an I/O trap within the predetermined time period, disable the watch-dog timer.

15. The IHS of claim 11, wherein the operational parameter includes a throttle value of the processor.

16. The IHS of claim 11, wherein the operational parameter includes a Geyserville value of the processor.

17. The IHS of claim 11, wherein the instruction is an I/O trap.

18. The IHS of claim 17, wherein the I/O trap is generated as a system management interrupt (SMI).

19. The IHS of claim 11, wherein the code includes a SMI handler.

20. The IHS of claim 11, wherein the instruction is generated by an operating system (OS) of the IHS.

* * * * *